United States Patent [19]

Mason

[11] Patent Number: 4,616,055

[45] Date of Patent: Oct. 7, 1986

[54] POROUS IRRIGATION PIPE AND METHOD

[75] Inventor: James W. Mason, Huntington Beach, Calif.

[73] Assignee: Dasurat Enterprises PTE, Ltd., apore

[21] Appl. No.: 733,711

[22] Filed: May 13, 1985

Related U.S. Application Data

[63] Continuation-in-part of Ser. No. 573,497, Jan. 24, 1984, Pat. No. 4,517,316.

[51] Int. Cl.⁴ ............................................. C08L 9/00
[52] U.S. Cl. .................................. 524/381; 138/118; 138/177; 138/DIG. 7; 239/145; 264/41; 264/45.1; 264/45.3; 264/45.9; 264/331.13; 405/45; 521/81; 524/495; 524/528
[58] Field of Search .................. 524/381, 495, 528; 239/145; 521/81; 405/45; 264/41, 45.1, 45.3, 45.9, 331.13; 138/118, 177, DIG. 7

[56] References Cited

U.S. PATENT DOCUMENTS

| | | | |
|---|---|---|---|
| 4,003,408 | 1/1977 | Turner | 405/45 |
| 4,013,102 | 3/1977 | DeLorean et al. | 138/DIG. 7 |
| 4,094,466 | 6/1978 | DeRomano | 239/145 |
| 4,162,863 | 7/1979 | Guadard et al. | 239/145 |
| 4,168,799 | 9/1979 | Turner | 239/145 |
| 4,238,260 | 12/1980 | Washkewicz | 138/126 |
| 4,434,250 | 2/1984 | Kessler | 264/41 |
| 4,517,316 | 5/1985 | Mason | 521/81 |

Primary Examiner—Maurice J. Welsh
Attorney, Agent, or Firm—Marvin E. Jacobs

[57] ABSTRACT

A mixture of virgin crumb rubber sized to between 30 mesh and 100 mesh containing less than 5%+100 fines and thermoplastic binder, such as carbon black filled polyethylene containing a coating promoter, such as a citrate salt and lubricant, such as a calcium stearate, is mixed in a vented Banburg mixer heated to at least 350° F. to remove volatiles through vent before extrusion. The mixture is formed into sheet in the nip of a two roll assembly and cooled in air before diced into pellets by a dicer.

The pellets are formed into porous pipe by extrusion in a pipe extruder having the feeding, transition and metering zones separately heated to temperatures from 320° F. to 400° F. ($T_1$, $T_2$, $T_3$). The die has a separate jacket receiving heat exchange fluid for heating the die to a temperature from 290° F. to 380° F. to form a porous pipe having more uniformly spaced and sized pores and a smoother inner wall surface. The linearity factor, tensile strength and elongation are also improved.

20 Claims, 10 Drawing Figures

POROUS IRRIGATION PIPE AND METHOD

CROSS-REFERENCE TO RELATED APPLICATION

This application is a continuation-in-part of Ser. No. 573,497 filed Jan. 24, 1984, now issued on May 14, 1985 as U.S. Pat. No. 4,517,316.

DESCRIPTION

1. Technical Field

This invention relates to the production of porous irrigation pipes and, more particularly, to an irrigation pipe fabricated by an improved method utilizing a novel precursor material.

2. Background Art

As population steadily increases, water becomes a more important and increasingly scarcer and more expensive resource. Agriculture is one of the most important uses of surface water. It is necessary to develop more efficient systems for delivering water to plants. Surface watering tends to be wasteful since water that is not absorbed quickly enough runs off or evaporates, and the water that is absorbed must wet the soil until it reaches the roots, the water gathering system for most plants.

Surface irrigation systems must be removed and replaced each time the field is tilled or plowed for replanting. Irrigation systems interfere with mechanical harvesting and require substantial maintenance. Above ground watering should usually be conducted during the day since many plants are subject to decay at night. Furthermore, above-ground watering interferes with usage of recreational areas such as parks, athletic fields and golf courses. Surface watering is non-specific in that the crop and weeds are both equally watered.

Because of the limitations in above-ground irrigation, subsurface irrigation systems have been developed in which water is directly fed at an optimum subsurface depth to the roots of the crop being cultivated. The pipe must be inert to the soil environment, must be capable of withstanding hydrostatic pressure in the presence of hard objects, such as rocks without collapse and preferably is flexible, so that it does not suffer brittle failure and can be bent to follow crop-line contours.

There are numerous agricultural applications for an irrigation pipe which leaks water slowly over its entire surface and length. Such pipes can be buried underground at levels appropriate for the particular crop being grown, and will supply water directly to the root system. With proper controls, the water level in the soil can be maintained at near-optimum levels. With some crops, this has been shown to increase yields substantially.

A porous irrigation pipe has been produced from reclaimed tire rubber mixed with a binder such as polyethylene. This mixture is extruded to form the pipe, and the water present within the hot extrudate vaporizes, producing the small pores through which water seeps under pressures of a few psi. While this pipe is useful for some applications, it has several drawbacks for many large-scale agricultural uses. The most important problem with the present product is its highly variable porosity. Some sections had no pores and other sections very large pores. The rate at which water emerges from this product varies by 50 to 75 percent or more within a few feet along its length. If it were used with closely spaced plantings, such as densely packed sugar cane plants, some areas would be overwatered, while others would be essentially dry.

Another problem is that the overall porosity of the pipe is poorly controlled from lot to lot. This causes severe engineering problems when one tries to design a water system for a particular location. What is normally done is to use many pressure regulators throughout the system. This is expensive and further limits the potential applications of the porous pipe material.

It has been discovered that the wide variation in porosity is due to failure to control the moisture content of the raw materials. The dry powder is somewhat hygroscopic and prior production systems disclosed by Turner in U.S. Pat. Nos. 4,003,408; 4,110,420 and 4,168,799 relied on absorption of water by the crumb material to provide the blowing or pore forming agent. However, the water content of each batch or portion of a batch varies with humidity, temperature, etc. of the environment. Since the amount of water present in the extrudate is very important to the porosity of the final pipe, variations in the water content of the feed will produce unacceptable variations of the product. Turner attempted to control excess water by venting the extruder but this did not effectively control variations in porosity.

The raw material is a mixture of fine powders and small amounts of oils. Such materials do not feed well in single-screw extruders. Moreover, uneven feeding of the powders will produce variations in the density and thickness in the wall of the pipe. Since these factors are important to the porosity of the wall, uneven feeding in the extruder will result in further inconsistent leak rates.

STATEMENT OF THE INVENTION

Porous irrigation pipe having constant porosity along long lengths of pipe was disclosed in my earlier application Ser. No. 573,497 filed Jan. 24, 1984, now U.S. Pat. No. 4,517,316.

The improved, porous irrigation pipe is made possible by accurate control of the water content of the raw material and by providing the raw material in a form in which it feeds consistently and reliably to the extruder. High surface area crumb rubber and powder mixtures have water contents varying from about 0.2 percent by weight up to several percent water by weight and vary throughout the batch. The moisture content of the material is controlled to not vary by more than ±10 percent throughout the batch and to be at a value between 0.5 to 3 percent by weight, preferably from about 0.75 percent by weight to 1.5 percent by weight of water.

The improved pipe is preferably produced by preprocessing the raw material into a shaped pellet form. This material feeds very consistently and reliably into a variety of types of single screw extruders. This makes it possible to produce the porous pipe in virtually any location where standard extrusion equipment is available. This reduces cost of shipping, production and installation of the porous pipe. Additionally, the moisure content of the pellets can be adjusted to predetermined, specific values depending on the desired porosity and leak rate. The pellets are stored under water-excluding conditions such as in vapor barrier containers. The pellets are much less hygroscopic than the high surface area powder materials or the prior art.

Another difference in the production methods is that the use of a non-vented extruder becomes possible since water content is known and there is no need to vent excess vapor pressure. Since the parameters of water content and feed rate are controlled and the temperature is controllable, porosity can be controlled by preselection of water content of the pellets. Alternately, since all variables are controlled, porosity of a batch or run can be controlled by changing the temperatures in the extruder and die.

The pellet form of feed containing controlled moisture content and pelletizing additives makes possible continuous production in high volume of porous irrigation pipe with very consistent leak rates on a variety of extruders anywhere in the world where the pipe is needed. The porous pipe can be optimized for porosity, size and strength for the intended application. In addition to the savings in shipping and production, and reduction in the number of pressure regulators required, porous pipe produces irrigation systems which in many cases will yield substantial increases in crop yields due to more accurate and uniform watering cycles, with particular applications to underground drip or continuous irrigation of densely packed crops such as sugar cane.

Though the porous pipe produced by use of pellets having controlled moisture resulted in a significant increase in uniformity as determined by the consistency factor, Cv, the smoothness, strength and flexibility were not completely satisfactory and the flow rate was still not as consistent as desired. Poor strength and flexibility result in cracking or breaking of the pipe. Smoothness of the internal surface of the pipe causes loss of pressure through friction between the wall and the moving column of water and this limits the length of a run of pipe.

Pipe produced according to the process disclosed in the Turner patents is limited to runs of about 500 feet due to poor linearity and high frictional loss. Another pipe produced according to the Turner patents is much smoother but has such poor linearity that it is also limited to very short runs.

Porous pipe having excellent linearity and much higher strength and smoothness has been produced according to the invention. Pipe runs can be increased by several factors up to runs of 2500 feet or more. Furthermore, the pore structure is more regular and uniform and the pores are more evenly spaced. The inside wall is much smoother and has fewer protrusions than prior porous pipes. The rubber particles are found to be more uniformly coated with the binder resin and to be only connected by point contact.

These further improvements in properties of the porous pipe are believed due to further control of the parameters of the materials used and of the parameters practiced during the pelletizing and extrusion steps. The materials have been improved by the use of a fresh source of vulcanized crumb as contrasted with a reclaimed source. The vulcanized rubber utilized is a carbon-filled, vulcanized scrap recovered from flashing or other overruns during the manufacture of tires or other rubber products. The scrap is carefully sized to a uniform particle size between −30 and 100 mesh containing no more than 5%+100 mesh fines. It is much cleaner, firmer and stronger than rubber crumb reclaimed from tires and the uniform particle size without fines provides uniformity in the shape, size and spacing of the pores. It also contributes to providing a smoother inner wall without protruberances.

Another improved feature of the invention is the addition of additives that increase the flow of the binder resin around the rubber particles. This provides more even pores and more uniformly spaced pores. It further provides improvement in strength and flexibility of the porous pipe. The more completely covered particles provide a smoother inner wall with a substantially higher coefficient of friction.

It has further been discovered according to the invention that the pore formation is not only due to generation of steam from the controlled amount of water present but that other volatiles are present such as the decomposition products of sulfur containing compounds, mineral compounds that evolve carbon dioxide and other gasses present in the starting materials. These volatiles can result in variations in pore size. The uncontrolled volatiles are removed in the invention by heating the composition to a temperature high enough to boil off the volatiles before forming the pellets, similarly by heating the composition to the highest temperature experienced during extrusion, usually 350° F. to 400° F. The composition can be heated in the mixing apparatus, such as a Banbury mixer. The hot composition need not be extruded to form pellets. The hot flowable composition can be formed into a sheet in a two roll mill, cooled in air and diced to form cubes, cylinders, hexagons, etc.

These and many other features and attendant advantages of the invention will become apparent as the invention becomes better understood by reference to the following detailed description when considered in conjunction with the accompanying drawings.

DETAILED DESCRIPTION OF THE INVENTION

The pelletizable mixture of the invention includes a major portion of elastomer in crumb form, a minor amount, usually from 1.0 to 6.0 phr of a slip agent, preferably a mineral such as talc and 0.1 to 1.0 phr of a lubricant, such as a metal stearate. Coating promoters such as 0.001 to 0.1 phr of a citrate salt and an 0.1 to 1.0 phr of a carbon black may also be present.

The elastomer can be natural rubber which is cis-1,4-polyisoprene or synthetic homopolymers of butadiene or isoprene or their copolymers with minor amounts of 0.1 to 20 percent by weight of vinyl monomers such as styrene, isobutylene or acrylonitrile. It is preferred that the elastomer be vulcanized. A ready and inexpensive source of prevulcanized crumb rubber is available as rubber reclaimed from automobile tires after removal of the metal tire cords and metal reinforcement in the head. The rubber is ground into crumb particles no larger than those passing through a 10 mesh screen, preferably from 20 mesh to 60 mesh.

The binder resin is a thermoplastic material capable of softening at a temperature below 300° F. so that pores will form during extrusion. The resin must be stable to longterm exposure to soil environment and to fertilizers, herbicides or pesticides seeping into the adjacent soil or to fertilizers, growth regulators herbicides or pesticides dispensed by dissolving in the irrigation water. The resin must be inert to the other components of the pipe such as the crumb rubber under extrusion conditions. Polyvinyl acetate is excluded from use since it will react with the crumb rubber. Styrene polymers including impact polystyrene copolymers are useful as are linear polyamides such as various Nylons, polyvinyl-chloride, polypheneylene oxide and polypheneylene sulfide polymers.

The most preferred group of polymers are the linear polymers of alkenes of 2 to 4 carbon atoms such as polyethylene, polypropylene or polybutene. These polymers are unreactive in soil and in the extrusion barrel and have long segments of linearity providing crystalline behavior. Polyethylenes have lower melting temperatures, are tougher and hold shape better. High density polyethylenes have densities from about 0.94 to about 0.97 gm/cc, and porous pipe prepared with all high density polyethylene binder are somewhat stiff, brittle and difficult to extrude. Low density polyethylenes have densities from about 0.90 to 0.93 gm/cc, and porous pipe prepared with all low density polyethylene binder are very flexible and can readily be bent to follow a desired path and are readily extruded. These pipes are very useful for above-ground irrigation. However, wall stiffness may not be adequate for subsurface systems. The pipe develops kinks in the bends and does not hold its shape. The optimum binder which provides a porous pipe which holds its shape without brittleness yet has adequate flexibility is composed of 50 percent to 80 percent by weight of high density polyethylene, preferably 60 percent to 70 percent to 20 percent to 50 percent by weight of low density polyethylene, preferably 30 percent to 40 percent. The polyethylene can be used in any commercial form such as powder, flake or pellets. Reclaimed polyethylene materials can also be used. The form and color of such materials have little effect upon the product.

The slip agent aids in extruding the rubber binder mixture. Finely divided minerals other than talc can be utilized such as clays, silicas, carbonates, or micas. The metal stearate lubricant can be selected from calcium, magnesium or zinc stearates, though calcium appears to provide the best porous pipe.

Figures 1, 2, 3:
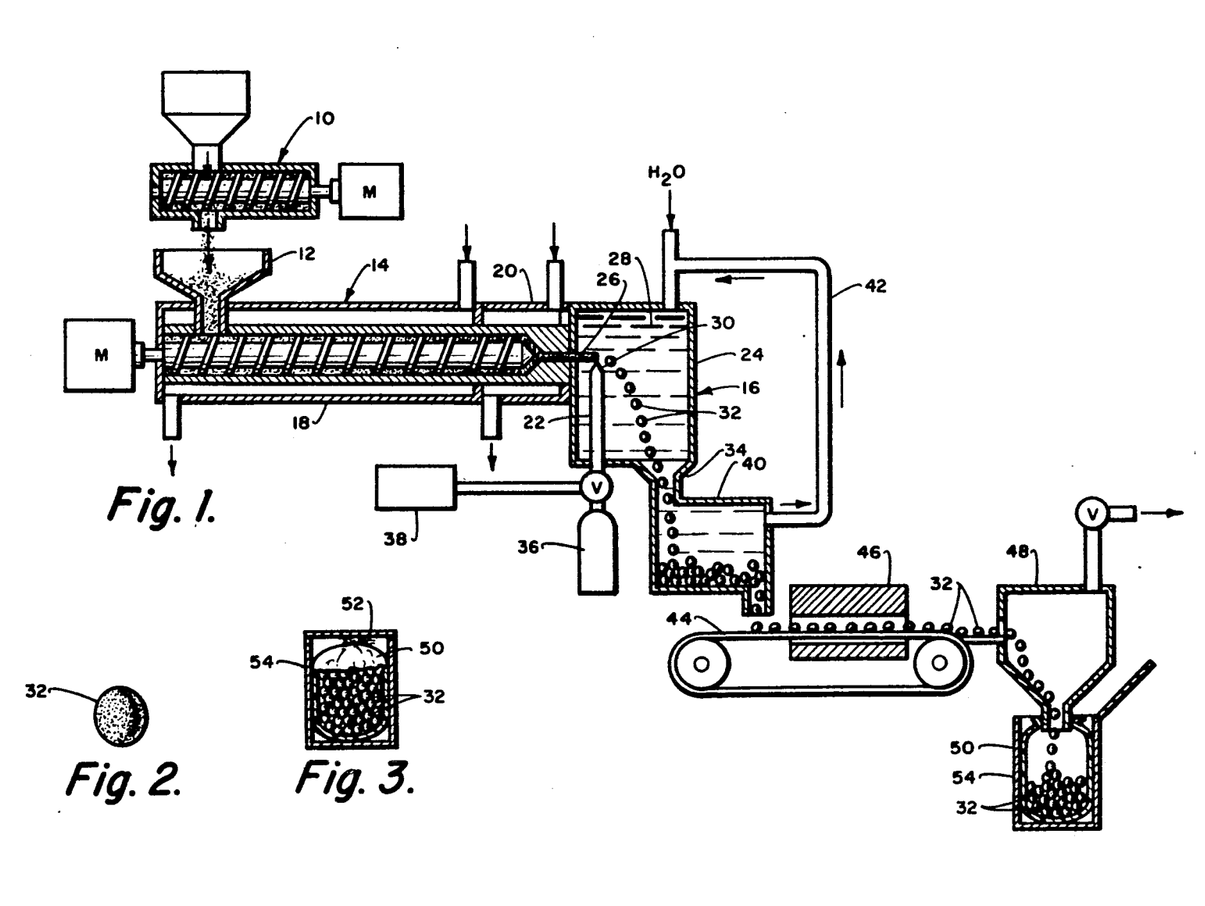
FIG. 1 is a schematic view of a train of equipment for producing pellets in accordance with the invention.
FIG. 2 is an enlarged view in elevation of a pellet.
FIG. 3 is a partially broken-away view in elevation of a humidity-controlled storage container.

Referring now to FIGS. 1-3, the crumb rubber, additives and binder are thoroughly dry blended in blender 10 such as a ribbon blender or other suitable mixing device to form material which is fed to the hopper 12 of the extruder 14. The mixture is pelletized by being extruded into a die-face pelletizing system. An extruder feeding directly into an underwater or water-ring pelletizer 16 is illustrated. A turn-screw extruder is preferred though a single-screw extruder equipped with a good crammer can be utilized. Strand pelletizers do not work well with the rubber-binder composition of the invention. The extruder is maintained at a temperature of from 320° F. to 400° F. and the die at a temperature from 250° F. to 325° F. by means of separate heating systems such as a set of heating jackets 18, 20 receiving separate flows of heated exchange fluids. The extruded strand material should have a bulk density after drying of at least 0.25 gm/cc and has a diameter from 3 to 20 mm, preferably 4 to 10 mm. The strand is broken into lengths of 3 to 20 mm by means of a mechanical knife 22 immersed in the water bath 24. The water in the bath is cool, usually from 20° F. to 80° F. and as the extruded strand 26 enters the water 28, it congeals and sets so that a thin blast of air from nozzle 30 breaks the strand 26 into pellets 32 which fall into the collector portion 34 of the water bath 24. The nozzle 30 is connected to an air supply 36 which is pulsed by a controller 38.

The dispersion of pellets in water is fed from water bath 24 into a separator such as a cyclone separator 40. The water is recycled to the bath 24 through line 42 while the pellets 32 are delivered by conveyor belt 44 to a dehumidifying drier 46 to dry the pellets to a preselected moisture content between 0.5 to 2.5% by weight depending on the porosity desired. The conveyor belt 44 carries the dried pellets 32 into a closed hopper 48 having a humidity controlled atmosphere which feeds the pellets into a storage container such as a polyethylene bag 50. The bag is closed with a secure closure such as a band 52 of metal and can be placed in an outer protective container such as a box or a barrel 54. The dried pellets contain a uniform moisture content which can be accurately controlled and the moisture content is stable for extended periods. The pellets have a much smaller surface area than the prior powder materials and are humidity stable without storage for short periods of time.

Figure 6:
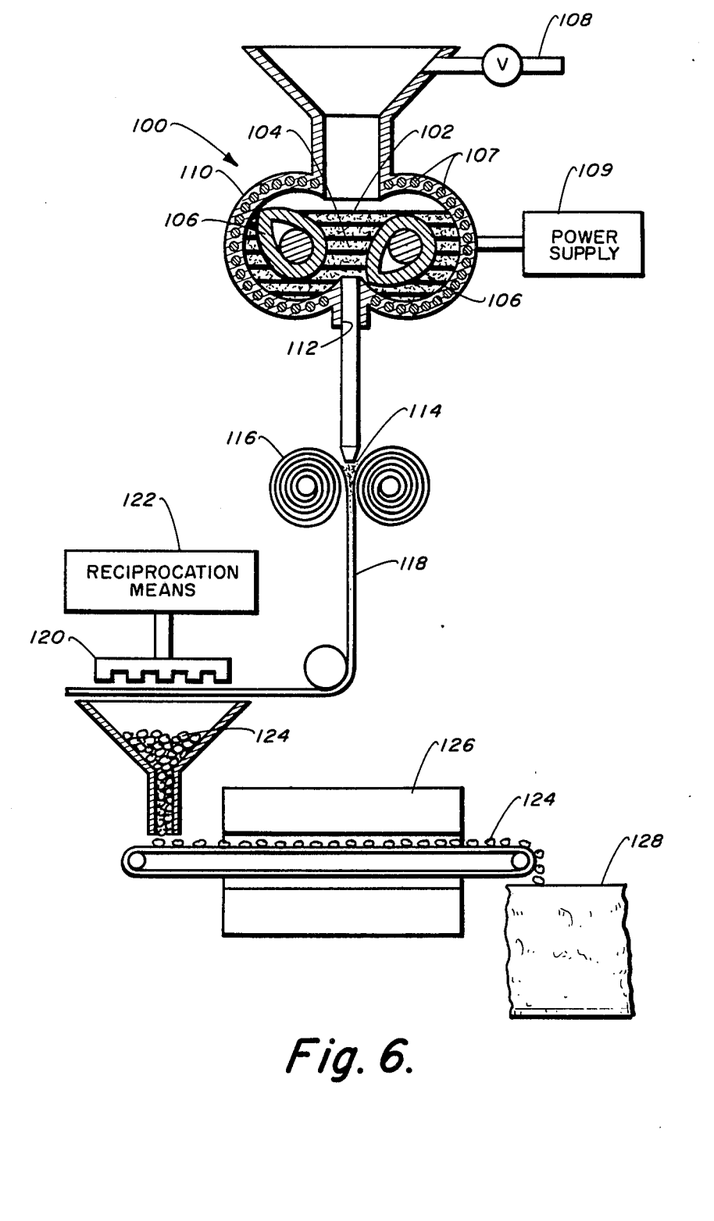
FIG. 6 is a schematic view of of an alternate apparatus for producing pellets.
Figure 7:
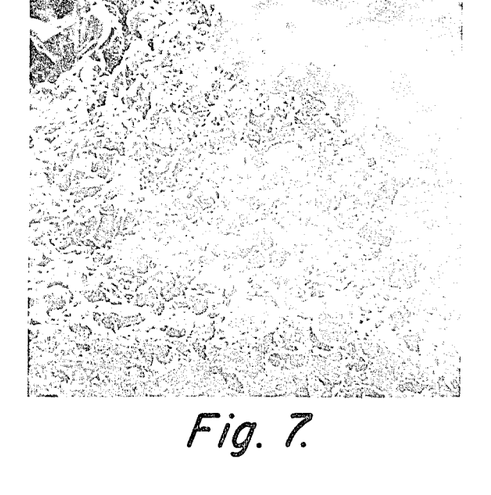
FIG. 7 is a photomicrograph of a prior art porous pipe at 20× magnification.
Figure 8:
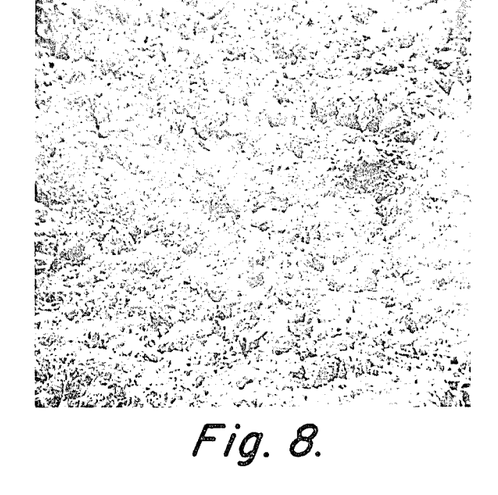
FIG. 8 is a photomicrograph of a porous pipe of the invention at 20× magnification.
Figure 9:
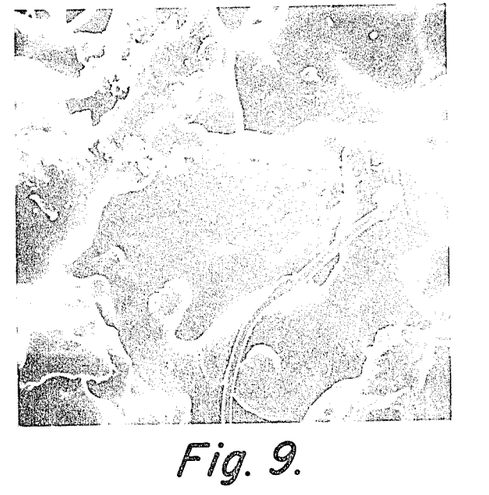
FIG. 9 is a photomicrograph of a prior art porous pipe at 200× magnification.

Referring now to FIG. 6 an alternate system for forming pellets comprises a Banbury mixer 100 containing a cavity 102 which receives the rubber-binder mixture. The intensive mixing of the charge 104 by rotors 106 and resistance rods 107 raises the temperature to about 400° F. The volatiles generated are removed through a vent 108. The cavity can be heated, if needed, by heating the walls 110 of the cavity by means of resistance rod heaters 107 powered by power supply 109 or a shell receiving a flow of heat exchange fluid.

The degassed composition is flows from the outlet 112 into the nip 114 of a two roll sheet extruder 116 to form a sheet 118. After the sheet has cooled in air it is fed under dicer head 120 of the dicer 122 to form pellets 124 which are dried in drier 126 before being collected and sealed in bags 128.

Figures 4, 5:
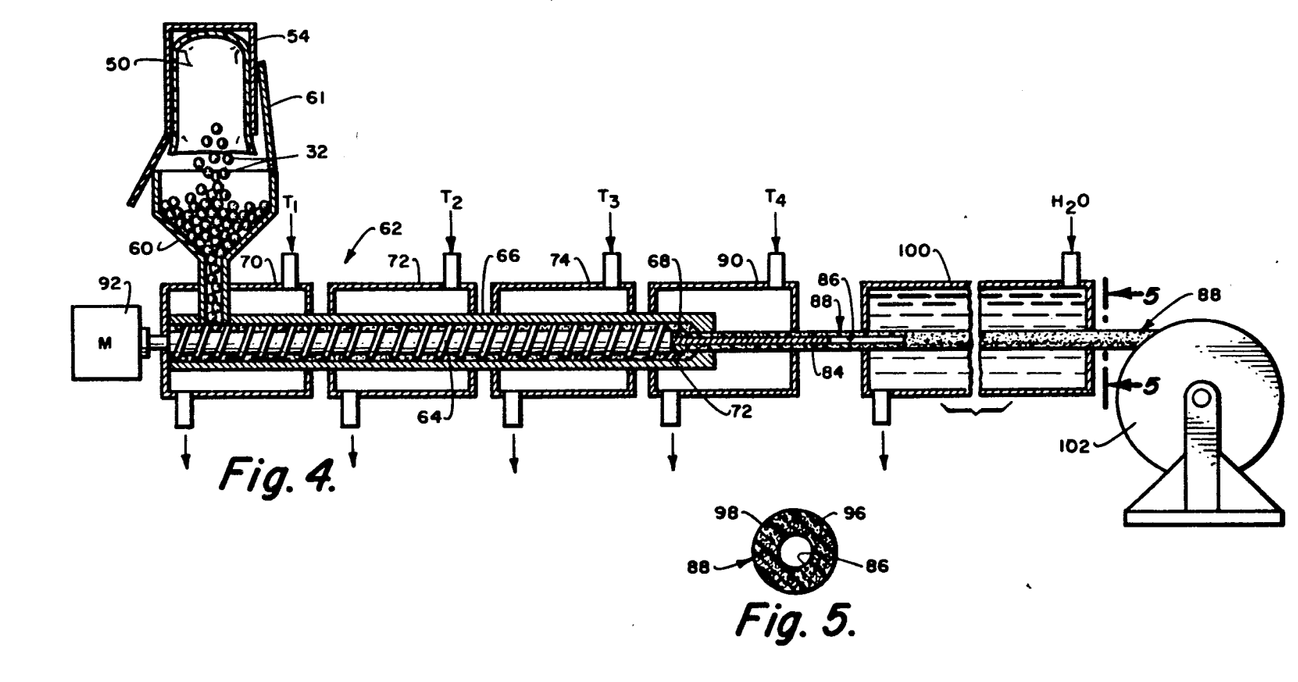
FIG. 4 is a schematic view of a system for extruding porous pipe in accordance with the invention.
FIG. 5 is a view in section taken along line 5—5 of FIG. 4.

Referring now to FIG. 4, the pellets 32 are fed to hopper 60 of a pipe extruder 62. The hopper has a lid 61 to isolate the feed from the environment. The extruder preferably contains a single low pressure screw 64 and has a length to diameter ratio of at least 24/1, preferably at least 35/1. The compression ratio of the feeding section to the metering section can be from 1.5/1 to 2.2/1. The diameter of the barrel 66 is suitable to produce pipes having outside diameters from 2 to 10 inches, usually from 3 to 6 inches. Mixing pins are to be avoided since the crumb rubber can foul these elements.

The process is operated at a temperature high enough to melt the binder resin but below the melting temperature of the elastomer. Good temperature control of the barrel and expecially of the die 68 is required usually to within ±5° F. A more uniform porous pipe is prepared by providing an increasing temperature profile over the length of extruder 62. Separate heating jackets 70, 72, 74 can surround the feeding, transition and metering sections, respectively, of the extruder barrel 66. Each jacket receives a separate flow of heat exchange fluid.

The feeding section can be heated to 340° F.–360° F. ($T_1$), the transition section from 360° F.–370° F. ($T_2$), and the metering section from 365° F. to 375° F. ($T_3$).

The die 80 is also provided with a separate temperature control. A suitable die is shown in FIG. 5 of U.S. Pat. No. 4,168,799. The die contains an outlet orifice 72 in front of which is mounted a mandrel 84 for forming the bore 86 of the porous pipe 88. The mandrel may be removable to vary the wall thickness of the pipe. The thickness is selected depending on desired flow rate, leak rate and wall strength to avoid collapse. Wall thickness is usually from 0.1 to 2.0 inches. In U.S. Pat. No. 4,168,799, the die is chilled to a temperature of from 40° F. to 80° F. in order to avoid forming an impermeable skin on the surface of the pipe, and the barrel is vented to remove excess pressure. However, in accordance with the present invention, the barrel need not be vented and the die is heated to a preselected temperature from 240° F. to 300° F. to control porosity of the porous pipe. An annular jacket 90 receives a flow of preheated heat exchange fluid ($T_4$).

As the screw 64 is rotated by motor 92, the feed moves forwardly and the binder resin melts. The water vaporizes and the expanding bubbles of steam form a network of pores 96 extending from the bore 86 to the surface 98 of the porous pipe. The pipe 88 can be extruded through the die 68 into the ambient and enters a chilling bath 100 containing water at a temperature of about 25° F. to 50° F. before being pulled onto rewind stand 102. The chiller bath usually has a length of at least 40 feet.

The invention will now be illustrated by the following specific examples of practice.

The dry materials were mixed in a ribbon blender and fed into the hopper of a twin-screw extruder heated to 360° F.–390° F. with a 5 mm die heated to 300° F. The water bath was maintained at 35° F.–40° F. and the 5 mm strand was chopped into approximately ground pellets about 8–9 mm in diameter by an air knife. After drying the pellets had a density of 0.275 gm/ml.

EXAMPLE 1

The following mixture was pelletized and dried to 0.75 percent moisture content:

| | |
|---|---|
| Crumbed Tire Rubber (48 Mesh) | 100 lb. |
| Low Density Polyethylene | 35 lb. |
| Finely Powdered Talc | 3 lb. |
| Zinc Stearate | .25 lb. |

These pellets were extruded in an unvented single screw extruder into porous pipe with an ID of 0.55 inch and a wall thickness of 0.2 inch. The extruder temperatures were:

| | |
|---|---|
| Extruder (all zones) | 350° F. |
| Gate | 340° F. |
| Spider | 335° F. |
| Die | 335° F. |

This porous pipe had the following porosities at 10 psi:
0.27±0.02 GPM/100 Linear Feet
0.11±0.003 GPM/100 Square Feet.

EXAMPLE 2

This same pelletized raw material of Example 1 was extruded under the same conditions, except that the die temperature was 290° F. This pipe had the following porosities at 10 psi.
0.19±0.17 GPM/100 Linear Feet
0.076±0.007 GPM/100 Square Feet.

EXAMPLE 3

Example 1 was repeated except that 35 lb. of high density polyethylene was substituted for the low density polyethylene binder. The pellets were more difficult to extrude and the pipe was more brittle and less flexible.

EXAMPLE 4

| | |
|---|---|
| Crumbed Tire Rubber (40 Mesh) | 100 lb. |
| High Density Polyethylene | 25 lb. |
| Low Density Polyethylene | 10 lb. |
| Slip Agent-Talc | 3 lb. |
| Lubricant-Calcium Stearate | 0.25 lb. |

The formulation was processed into pellets and dried to contain 1.0 percent moisture. The pellets were extruded in a 2.5 inch diameter, 24/1 L/D, Prodex single-screw extruder. The extruder was equipped with a PVC type screw, which had a compression ratio of 1.9/1, and a circular pipe die with a land-length of 16/1. Temperatures in the extruder were maintained at 340° F.–360° F. The gate, spider and die temperatures were adjusted to yield an extrudate having the temperatures shown below. Porous pipes having a wall thickness of 0.165 inch were produced having the following properties:

| Extrudate Temperature (°F.) | APPROXIMATE LEAK RATE | | |
|---|---|---|---|
| | | GPM/100 linear feet | |
| | GPM/100 sq ft | 0.5" ID Pipe | 1.0" ID Pipe |
| 250–260 | 0.10 ± 0.02 | 0.25 ± 0.04 | 0.50 ± 0.08 |
| 275–285 | 0.20 ± 0.03 | 0.50 ± 0.08 | 1.00 ± 0.16 |
| 300–320 | 0.40 ± 0.06 | 1.00 ± 0.16 | 2.00 ± 0.32 |
| 340–360 | 0.80 ± 0.12 | 2.00 ± 0.32 | 4.00 ± 0.64 |

The pellet material fed smoothly and the porous pipe had good compression strength, yet was flexible. The pipe had uniform porosity along its length. The consistency of leak rate is measured by determining the amount of flow of one foot increments over 50 feet of pipe to determine the consistency factor, Cv, —the standard deviation/flow rate.

For most prior commercial porous pipes, the Cv achievable is from 0.25 to 0.5. For most applications, a Cv of 0.2 is preferred and for densely packed plants such as sugar cane, a Cv of 0.1 is necessary to reduce no-growth in overwet or dry areas of irrigation.

A one-half inch I.D. porous pipe produced in accordance with the invention having a flow rate of 1 gpm/100 linear feet at 10 psi pressure has a Cv of 0.1 to 0.15 and a porous pipe having a flow rate of 0.25 gpm/100 linear feet has a measured Cv of 0.05 to 0.1.

Porous pipe having improved properties was produced by utilizing coating promoters as follows:

EXAMPLE 5

Virgin scrap rubber was sieved into −30 mesh with no more than 5% fines +100 mesh. 72.5 parts by weight of this rubber was mixed with 27.5 parts by weight of a mixture of 30% low density polyethylene having a melt index of 2 or less and 90% of a high density polyethylene having a melt index of 0.5 or less. 0.1 phr of carbon black, 0.1 phr of calcium stearate and 0.01 phr of ammonia citrate were added and the mixture fed to a Banbury mixer and mixed for several minutes at 400° F. with venting to remove volatiles.

The hot mixture was passed into the nip of a two roll mill to form a sheet and air cooled before dicing into cubes. The cubes were dried in an oven to a moisture content of 0.75 weight percent.

The pellets were extruded in an unvented single screw extruder at 340° F. to 360° F. under the conditions of Example 4 to form a porous pipe with a 3/32 inch wall. The linearity (Cv) at 10 psi was determined for pipes with leak rates as follows:

TABLE 1

| Cv | Flow rate, gph/100 ft. |
| --- | --- |
| 0.1 to 0.12 | 20 |
| 0.125 to 0.175 | 40–50 |
| 0.15 to 0.20 | 50–60 |
| 0.175 to 0.225 | 80–100 |

At higher leak rates, the pore sizes are larger and there is also a wider variation in pore size. The internal wall and pores of the porous pipe of Example 5 and of two pipes produced according to the Turner patents were examined. Photomicrographs of these pipes are shown in FIGS. 7–10. The improved smoothness of the pipe of the invention is apparent.

Figure 10:
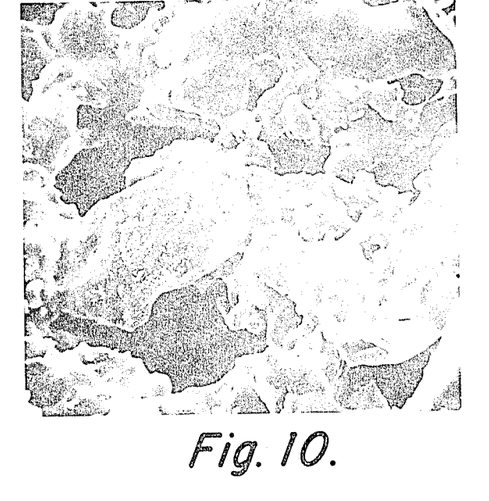
FIG. 10 is a photomicrograph of a porous pipe according to the invention at 200× magnification.

The degree of coating of the rubber particles is also apparent since free uncoated rubber particles are apparent in the 200× photo of FIG. 10. The unevenness of the prior art pipes causes more friction. The pores are more even since the binder resin evenly flows over the surface of the particles and the particles adhere only at points of contact where the binder resin bridges and connects the particles.

Physical properties of the pipe of the invention with a 3/32 inch wall were compared to two commercial porous pipes having 3/16 inch walls prepared according to the Turner patents.

EXAMPLE 6

| | Turner I | Turner II |
| --- | --- | --- |
| Tensile strength (psi) | 1175 | 795 | 650 |
| Elongation (%) | 90 | 100 | 110 |
| Linearity - Cv (typ.) | .1 | .3 | .25 |
| Fluid Friction Coef (est) | 110 | 100 | 80 |
| Coating of Rubber (%) | 95–98 | 90–95 | 75–80 |

The porous pipe of the invention is stronger, smoother and it is easier to control properties during manufacture than the Turner process. The tensile strengths and elongations were measured at the break point of standard test samples using the ASTM D638 method so the values presented are real and directly comparable. They clearly show that the pipe of the invention with a 3/32 inch wall is stronger than the Turner pipe with a 3/16 inch wall. The linearity values are averages of published test results by the manufacturers, University of Florida and U.C. Davis and tests conducted by the inventor.

The fluid friction coefficient is used to calculate the loss of pressure in a pipe due to friction between the water and the wall. The higher the number, the less frictional loss is encountered. Thus, higher numbers are better. In porous pipes, the frictional loss is combined with the linearity function to determine how long a run of pipe can be used in the field.

The Turner II pipe is limited to runs of about 500 feet due to its poor linearity and high frictional loss. The Turner I pipe is much smoother than the Turner II pipe, but its poorer linearity also limits it to very short runs. Calculations indicate with the good linearity and low frictional loss should make it possible to run the porous pipe of Example 6 in length of at least 2500 Feet.

The data values were carried out according to "Agricultural Engineering Extension Report 84-2", by A. G. Smajstria and D. S. Harrison, University of Florida, Gainsville, Fla. 32611, January, 1984.

The particle coating values were determined from the SEM pictures. They are based upon counting the coated and uncoated rubber particles on the inside surface of the tube samples. The SEM pictures clearly show some other things, though. The pore structure of the porous pipe of the invention is much more regular and evenly spaced than any of the other samples. The pipe of the invention is also much smoother, and has very few large protrusions. These differences are believed to be due to the mixing/pelletizing step, the addition of additives and use of evenly sided rubber particles which control the pore size, and the control of the moisture content in the raw material.

It is to be realized that only preferred embodiments of the invention have been described and that numerous substitutions, modifications and alternations are permissible without departing from the spirit and scope of the invention as defined in the following claims:

I claim:

1. A porous pipe comprising a hollow pipe having a pipe wall containing uniformly spaced pores, said pipe being formed of uniformly sized, vulcanized elastomer particles differing by no more than 5% from an average size dispersed in a thermoplastic resin, at least 90% of the particles exposed on the inner wall of the pipe being coated with said binder resin.

2. A pipe according to claim 1 in which the elastomer is vulcanized rubber.

3. A pipe according to claim 2 in which the rubber is a carbon-filled, virgin scrap rubber.

4. A pipe according to claim 1 in which the particles are sized to between −30 and 100 mesh.

5. A pipe according to claim 1 containing no more than 5%+100 mesh fines.

6. A pipe according to claim 1 in which the binder is a polyethylene resin.

7. A pipe according to claim 6 in which the polyethylene resin contains less than 1% coating promoters.

8. A pipe according to claim 7 in which the coating promoters comprise at least one material selected from a citrate salt and carbon black.

9. A pipe according to claim 8 in which the citrate salt is present in an amount from 0.001 to 0.1 phr and the carbon black is present in an amount from 0.1 to 1.0 phr.

10. A pipe according to claim 8 having a linearity function Cv from 0.1 to 0.25 and a fluid friction coefficient above 100.

11. A pipe according to claim 10 having a tensile strength above 800 and an elongation % below 1.00.

12. A method of forming particles for use in an extrusion process comprising the steps of:
mixing a mixture of rubber particles and binder resin while heating it to at least the temperature to be encountered during the extrusion process;

removing volatiles from the mixture during the mixing step;

forming the mixture into sheet; and comminuting the sheet into particles.

13. A method according to claim 12 in which the rubber particles are vulcanized, carbon filled, rubber in which the size does not vary by more than ±10%.

14. A method according to claim 13 in which the binder resin is a polyolefin.

15. A method according to claim 14 in which the polyolefin is polyethylene.

16. A method according to claim 15 in which the polyethylene contains less than 5 phr of carbon black.

17. A method according to claim 16 in which the polyethylene also contains less than 0.5 phr of a citrate salt.

18. A method according to claim 13 in which the sheet is commuted by dicing.

19. A method according to claim 18 further including the step of cooling the sheet before dicing.

20. A porous pipe according to claim 5 in which at least 95% of the particles on the surface of the inner wall of the pipe are coated with binder resin.

* * * * *